United States Patent
Shimizu et al.

(10) Patent No.: US 9,796,146 B2
(45) Date of Patent: Oct. 24, 2017

(54) METHODS FOR PRODUCING PHASE-DIFFERENCE FILM AND CIRCULARLY POLARIZING PLATE INVOLVING SIMULTANEOUS REDUCTION OF CLIP PITCH ON ONE SIDE AND INCREASE OF CLIP PITCH ON ANOTHER SIDE

(71) Applicant: NITTO DENKO CORPORATION, Ibaraki-shi, Osaka (JP)

(72) Inventors: Takashi Shimizu, Ibaraki (JP); Satoshi Hirata, Ibaraki (JO); Seiji Kondo, Ibaraki (JP); Nao Murakami, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 72 days.

(21) Appl. No.: 14/780,673

(22) PCT Filed: Mar. 12, 2014

(86) PCT No.: PCT/JP2014/056401
§ 371 (c)(1),
(2) Date: Sep. 28, 2015

(87) PCT Pub. No.: WO2014/156622
PCT Pub. Date: Oct. 2, 2014

(65) Prior Publication Data
US 2016/0052215 A1    Feb. 25, 2016

(30) Foreign Application Priority Data

Mar. 29, 2013 (JP) ................................ 2013-070789

(51) Int. Cl.
*B29D 11/00* (2006.01)
*B29C 55/04* (2006.01)
(Continued)

(52) U.S. Cl.
CPC ...... *B29D 11/00644* (2013.01); *B29C 55/045* (2013.01); *G02B 5/30* (2013.01);
(Continued)

(58) Field of Classification Search
None
See application file for complete search history.

(56) References Cited

U.S. PATENT DOCUMENTS 4,330,499 A    5/1982    von und zu Aufsess et al.
7,803,900 B2    9/2010    Nakai
(Continued)

FOREIGN PATENT DOCUMENTS

CN    1543396 A    11/2004
CN    101006370 A    7/2007
(Continued)

OTHER PUBLICATIONS

Japanese Office Action dated Oct. 22, 2014, issued in counterpart Japanese patent application No. 2013-070789, with English translation. (11 pages).
(Continued)

*Primary Examiner* — Stephone B Allen
*Assistant Examiner* — Ryan S Dunning
(74) *Attorney, Agent, or Firm* — Westerman, Hattori, Daniels & Adrian, LLP

(57) ABSTRACT

The present invention provides a method capable of producing a retardation film having an elongated shape, having high uniaxiality and a high in-plane alignment property, and having a slow axis in an oblique direction with high production efficiency. The production method for a retardation film of the present invention includes: holding left and right end portions of a film with left and right variable pitch-type clips configured to have clip pitches changing in a longitudinal direction, respectively; preheating the film; increasing
(Continued)

the clip pitch of the clips on one side and reducing the clip pitch of the clips on another side, while extending a distance between the left and right clips, to obliquely stretch the film; maintaining or reducing the clip pitch of the clips on the one side and increasing the clip pitch of the clips on the another side so that the clip pitches of the left and right clips are equal to each other, while extending the distance between the left and right clips, to obliquely stretch the film; and releasing the film from being held with the clips.

10 Claims, 11 Drawing Sheets

(51) Int. Cl.
B29C 55/16 (2006.01)
G02B 5/30 (2006.01)
B29K 69/00 (2006.01)
B29L 11/00 (2006.01)
B29C 55/20 (2006.01)

(52) U.S. Cl.
CPC .............. B29C 55/16 (2013.01); B29C 55/20 (2013.01); B29K 2069/00 (2013.01); B29L 2011/0066 (2013.01); G02B 5/3083 (2013.01)

(56) References Cited

U.S. PATENT DOCUMENTS

| | | | |
|---|---|---|---|
| 7,807,239 | B2 | 10/2010 | Konishi et al. |
| 8,028,383 | B2 | 10/2011 | Sano et al. |
| 8,535,588 | B2 | 9/2013 | Sano et al. |
| 8,778,486 | B2 | 7/2014 | Tanaka et al. |
| 8,952,600 | B2 | 2/2015 | Ren et al. |
| 2005/0019514 | A1 | 1/2005 | Takegawa et al. |
| 2007/0243367 | A1 | 10/2007 | Nagatake et al. |
| 2009/0036667 | A1 | 2/2009 | Hashimoto et al. |
| 2009/0116109 | A1 | 5/2009 | Konishi et al. |
| 2009/0128747 | A1 | 5/2009 | Sugiyama et al. |
| 2009/0261503 | A1 | 10/2009 | Sano et al. |
| 2009/0268292 | A1 | 10/2009 | Nakai |
| 2010/0221377 | A1 | 9/2010 | Sano et al. |
| 2012/0308796 | A1 | 12/2012 | Tanaka et al. |
| 2013/0163080 | A1 | 6/2013 | Araki et al. |
| 2013/0231455 | A1* | 9/2013 | Yasutomo .............. B29C 55/045 528/370 |
| 2013/0249378 | A1 | 9/2013 | Murakami et al. |
| 2013/0271833 | A1 | 10/2013 | Hatano |
| 2014/0225499 | A1 | 8/2014 | Ren et al. |
| 2014/0268333 | A1 | 9/2014 | Tanaka et al. |
| 2014/0268334 | A1 | 9/2014 | Tanaka et al. |
| 2014/0285888 | A1 | 9/2014 | Tanaka et al. |
| 2015/0247963 | A1 | 9/2015 | Fujisawa et al. |
| 2016/0052215 | A1 | 2/2016 | Shimizu et al. |
| 2016/0052216 | A1 | 2/2016 | Shimizu et al. |
| 2016/0096312 | A1 | 4/2016 | Shimizu et al. |

FOREIGN PATENT DOCUMENTS

| | | |
|---|---|---|
| CN | 101489760 A | 7/2009 |
| CN | 103052489 A | 4/2013 |
| EP | 2 502 947 A1 | 9/2012 |
| EP | 2570252 A2 | 3/2013 |
| EP | 2570252 A3 | 7/2013 |
| EP | 2570252 B1 | 7/2014 |
| JP | 2005-035131 A | 2/2005 |
| JP | 2005-319660 A | 11/2005 |
| JP | 2005-321543 A | 11/2005 |
| JP | 2006-348114 A | 12/2006 |
| JP | 2007-90753 A | 4/2007 |
| JP | 2007-094007 A | 4/2007 |
| JP | 2007-161994 A | 6/2007 |
| JP | 2007-261189 A | 10/2007 |
| JP | 2008-023775 A | 2/2008 |
| JP | 2008-162123 A | 7/2008 |
| JP | 2011-34069 A | 2/2011 |
| JP | 2011-034069 A | 2/2011 |
| JP | 2011-235610 A | 11/2011 |
| JP | 4845619 B2 | 12/2011 |
| JP | 2012-31332 A | 2/2012 |
| JP | 2012-67300 A | 4/2012 |
| JP | 2012-067300 A | 4/2012 |
| JP | WO 2012070451 A1 * | 5/2012 ........... B29C 55/045 |
| JP | 2012-163931 A | 8/2012 |
| JP | 2012-181536 A | 9/2012 |
| JP | 2012-226996 A | 11/2012 |
| JP | 2013-054338 A | 3/2013 |
| JP | 2013-54338 A | 3/2013 |
| JP | 2013-075512 A | 4/2013 |
| JP | 2013-83907 A | 5/2013 |
| JP | 2013-120208 A | 6/2013 |
| JP | 2013-186399 A | 9/2013 |
| JP | 5333699 B1 | 11/2013 |
| JP | 5333699 B1 | 11/2016 |
| KR | 10-2009-0030314 A | 3/2009 |
| TW | 200925672 A | 6/2006 |
| TW | 201234059 A1 | 8/2012 |
| WO | 03/056368 A1 | 7/2003 |
| WO | 2012/014595 A1 | 2/2012 |
| WO | 2012/017639 A1 | 2/2012 |
| WO | 2012/032984 A1 | 3/2012 |
| WO | 2012/070451 A1 | 5/2012 |
| WO | 2012/077663 A1 | 6/2012 |
| WO | 2012/091009 A1 | 7/2012 |
| WO | 2013/038807 A1 | 3/2013 |
| WO | 2013/039178 A1 | 3/2013 |
| WO | 2013/125211 A1 | 8/2013 |

OTHER PUBLICATIONS

Japanese Office Action dated Jan. 21, 2015, issued in counterpart Japanese patent application No. 2013-070789, with English translation. (8 pages).

Taiwanese Office Action dated Jun. 22, 2015, issued in counterpart Taiwanese patent application No. 103111890, with English translation. (9 pages).

Office Action dated Jan. 13, 2016, issued in counterpart Japanese Patent Application No. 2015-058520, with English translation. (9 pages).

Office Action dated Oct. 27, 2016, issued in counterpart Chinese Application No. 201480018492.5, with English translation. (18 pages).

office Action dated Jan. 13, 2016, issued in Japanese Patent Application No. 2015-058554, with English translation. (11 pages).

Office Action dated Oct. 22, 2014, issued in Japanese Application No. 2013-070788, with English translation. (12 pages).

Office Action dated Jan. 21, 2015, issued in Japanese Application No. 2013-070788, with English translation. (8 pages).

Office Action dated Jan. 27, 2016, issued in Japanese Patent Application No. 2015-058491, with English translation. (9 pages).

Extended (supplementary) European Search Report dated Oct. 5, 2016, issued in European Application No. 14773926.2. (9 pages).

International Search Report dated Jun. 3, 2014, issued in International Application No. PCT/JP2014/056403, with English translation. (4 pages).

Office Action dated Nov. 29, 2016, issued in Korean Patent Application No. 10-2015-7026546, with English translation. (12 pages).

English translation of International Search Report dated May 27, 2014, issued in International Application No. PCT/JP2014/056433. (1 page).

Office Action dated Dec. 27, 2016, issued in Chinese Patent Application No. 201480032264.3, with English translation. (19 pages).

Japanese Office Action dated Jan. 21, 2015 issued in Japanese patent application No. 2013-121537, with English translation. (9 pages).

Taiwanese Office Action dated Aug. 26, 2015 issued in Taiwanese patent application No. 103111892, with English translation. (9 pages).

(56) References Cited

OTHER PUBLICATIONS

Japanese Office Action dated Oct. 22, 2014, issued in Japanese patent application No. 2013-121537, with English translation. (9 pages).
Non-Final Office Action dated Feb. 14, 2017, issued in U.S. Appl. No. 14/780,695 (28 pages).
Non-Final Office Action dated Feb. 28, 2017, issued in U.S. Appl. No. 14/892,808 (19 pages).
Notice of Allowance dated May 25, 2017, issued in U.S. Appl. No. 14/780,695 (15 pages).
Notice of Allowance dated Jun. 15, 2017, issued in U.S. Appl. No. 14/780,695 (15 pages).
Final Office Action dated Jun. 16, 2017, issued in U.S. Appl. No. 14/892,808 (21 pages).
Office Action dated Jun. 23, 2017, issued in Korean application No. 10-2015-7034396, with English translation. (2 pages).

* cited by examiner

WHEN CLIP PITCH OF RIGHT CLIPS IS PREVIOUSLY INCREASED

MOVING SPEED IMAGES OF CLIPS WHEN CLIP PITCH OF
RIGHT CLIPS IS PREVIOUSLY INCREASED (v2'=v3')

MOVING SPEED IMAGES OF CLIPS WHEN CLIP PITCH OF
RIGHT CLIPS IS PREVIOUSLY INCREASED (v2'>v3')

METHODS FOR PRODUCING PHASE-DIFFERENCE FILM AND CIRCULARLY POLARIZING PLATE INVOLVING SIMULTANEOUS REDUCTION OF CLIP PITCH ON ONE SIDE AND INCREASE OF CLIP PITCH ON ANOTHER SIDE

TECHNICAL FIELD

The present invention relates to a production method for a retardation film and a production method for a circularly polarizing plate.

BACKGROUND ART

A circularly polarizing plate has been used in an image display apparatus such as a liquid crystal display apparatus (LCD) or an organic electroluminescence display apparatus (OLED) for the purposes of improving its display characteristics and preventing reflection. The circularly polarizing plate is typically obtained by laminating a polarizer and a retardation film (typically a λ/4 plate) so that the absorption axis of the polarizer and the slow axis of the retardation film may form an angle of 45°. Hitherto, the retardation film has been typically produced by performing uniaxial stretching or biaxial stretching in a longitudinal direction and/or a lateral direction, and hence its slow axis is expressed in the lateral direction (widthwise direction) or longitudinal direction (lengthwise direction) of a raw film in many cases. As a result, in order to produce the circularly polarizing plate, it has been necessary to perform the following. The retardation film is cut so as to form an angle of 45° relative to its lateral direction or longitudinal direction, and the resultant pieces are bonded to the polarizer one by one.

To solve such problem, there has been proposed a technology involving performing stretching in an oblique direction to express the slow axis of the retardation film in the oblique direction (for example, Patent Literature 1). However, the retardation film obtained by the stretching in the oblique direction has high biaxiality (e.g., has a large Nz coefficient). The use of such retardation film in an image display apparatus having a high reflectance involves a problem in that a change in reflectance or reflection hue of the apparatus increases depending on a viewing angle. In addition, any one of the technologies proposed heretofore involves a problem in that the alignment property of a retardation is low and the thickness of a retardation film or a circularly polarizing plate is large.

CITATION LIST

Patent Literature

[PTL 1] JP 4845619 B2

SUMMARY OF INVENTION

Technical Problem

The present invention has been made to solve the problems of the related art, and an object of the present invention is to provide a method capable of producing a retardation film having an elongated shape, having high uniaxiality and a high in-plane alignment property, and having a slow axis in an oblique direction with high production efficiency. Another object of the present invention is to provide a method capable of producing a circularly polarizing plate excellent in optical characteristics with high production efficiency.

Solution to Problem

The present invention provides a production method for a retardation film. The production method for a retardation film includes: holding left and right end portions of a film with left and right variable pitch-type clips configured to have clip pitches changing in a longitudinal direction, respectively (holding step); preheating the film (preheating step); increasing the clip pitch of the clips on one side and reducing the clip pitch of the clips on another side, while extending a distance between the left and right clips, to obliquely stretch the film (first oblique stretching step); maintaining or reducing the clip pitch of the clips on the one side and increasing the clip pitch of the clips on the another side so that the clip pitches of the left and right clips are equal to each other, while extending the distance between the left and right clips, to obliquely stretch the film (second oblique stretching step); and releasing the film from being held with the clips (releasing step).

In a preferred embodiment, in the first oblique stretching step, the reducing the clip pitch of the clips on another side is started after the increasing the clip pitch of the clips on one side is started.

In a preferred embodiment, in the first oblique stretching step and the second oblique stretching step, an oblique stretching ratio determined from the following equation (1) is 2.0 or more, and in the first oblique stretching step, a change ratio of the clip pitch of the clips on the another side is 0.5 or more and less than 1:

$$S=\sqrt{W_3^2+(v3'*(t3-t3'))^2}/W_1 \qquad \text{Equation (1)}$$

where:

$W_1$ represents a width of the film before the first oblique stretching (unit: m);

$W_3$ represents a width of the film after the second oblique stretching (unit: m);

$v3'$ represents a moving speed of the clips having a clip pitch to be increased in the first oblique stretching step when the clip pitch of the clips changes to a predetermined clip pitch in the second oblique stretching step (unit: m/sec);

$t3$ represents a time period from entry of the clips having a clip pitch to be reduced in the first oblique stretching step into a preheating zone to an end of the second oblique stretching step (unit: sec); and $t3'$ represents a time period from entry of the clips having a clip pitch to be increased in the first oblique stretching step into the preheating zone to the end of the second oblique stretching step (unit: sec).

In a preferred embodiment, in the first oblique stretching step, a product of a change ratio of the clip pitch of the clips on the one side and a change ratio of the clip pitch of the clips on the another side is from 0.7 to 1.5.

In a preferred embodiment, a formation material for the film contains a polycarbonate resin, a polyvinyl acetal resin, a cycloolefin-based resin, a cellulose-based resin, a cellulose ester-based resin, a polyester-based resin, or a polyester carbonate-based resin.

According to another aspect of the present invention, a retardation film is provided. The retardation film is produced by the production method. The retardation film has an elongated shape and has a slow axis in a direction forming a predetermined angle relative to a lengthwise direction.

According to still another aspect of the present invention, a production method for a circularly polarizing plate is provided. The production method for a circularly polarizing plate includes continuously bonding the retardation film and a polarizing plate having an elongated shape with lengthwise directions of the film and the plate aligned with each other while conveying the film and the plate.

Advantageous Effects of Invention

According to the embodiments of the present invention, the oblique stretching is performed while one side edge portion of the film is shrunk in its lengthwise direction and the other side edge portion of the film is stretched in the lengthwise direction, whereby the retardation film having an elongated shape, having high uniaxiality and a high in-plane alignment property, and having a slow axis in an oblique direction can be obtained with high production efficiency. Further, according to the embodiments of the present invention, the retardation film thus obtained and the polarizing plate are laminated by the so-called roll-to-roll process, whereby the circularly polarizing plate excellent in optical characteristics can be obtained with high production efficiency.

DESCRIPTION OF EMBODIMENTS

Now, preferred embodiments of the present invention are described. However, the present invention is not limited to these embodiments.

A production method for a retardation film of the present invention includes: holding left and right end portions of a film with left and right variable pitch-type clips configured to have clip pitches changing in a longitudinal direction, respectively (holding step); preheating the film (preheating step); increasing the clip pitch of the clips on one side and reducing the clip pitch of the clips on another side, while extending a distance between the left and right clips, to obliquely stretch the film (first oblique stretching step); maintaining or reducing the clip pitch of the clips on the one side and increasing the clip pitch of the clips on the another side so that the clip pitches of the left and right clips are equal to each other, while extending the distance between the left and right clips, to obliquely stretch the film (second oblique stretching step); and releasing the film from being held with the clips (releasing step). Now, the respective steps are described in detail.

A. Holding Step

Figure 1:
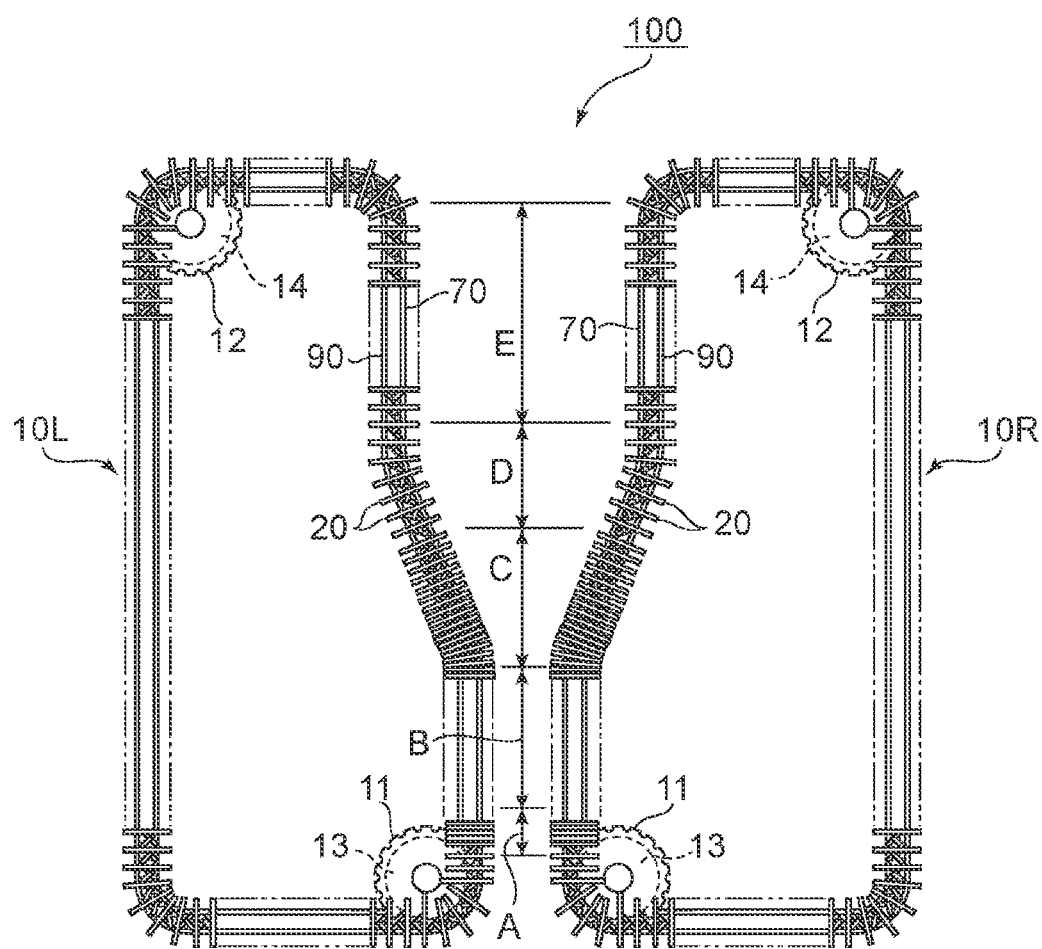
FIG. 1 is a schematic plan view for illustrating the entire construction of an example of a stretching apparatus that can be used in a production method of the present invention.
Figure 2:
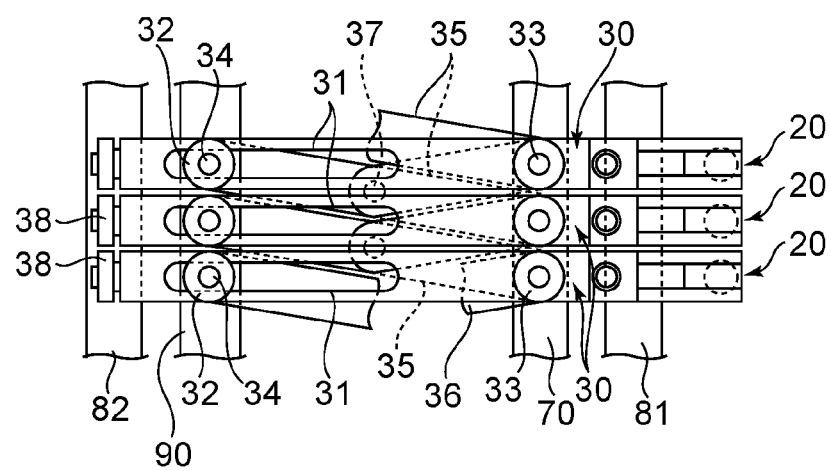
FIG. 2 is a main portion schematic plan view for illustrating a link mechanism via which a clip pitch is changed in the stretching apparatus of FIG. 1, the view being an illustration of a state in which the clip pitch is minimum.
Figure 3:
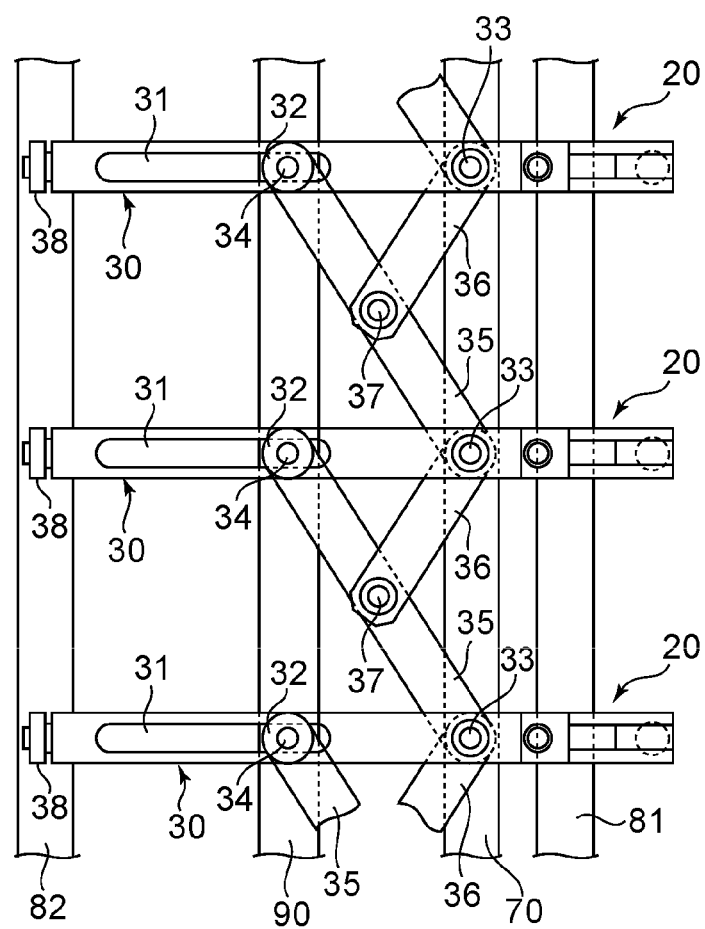
FIG. 3 is a main portion schematic plan view for illustrating the link mechanism via which the clip pitch is changed in the stretching apparatus of FIG. 1, the view being an illustration of a state in which the clip pitch is maximum.

First, a stretching apparatus that can be used in the production method of the present invention including this step is described with reference to FIG. 1 to FIG. 3. FIG. 1 is a schematic plan view for illustrating the entire construction of an example of the stretching apparatus that can be used in the production method of the present invention. FIG. 2 and FIG. 3 are each a main portion schematic plan view for illustrating a link mechanism via which a clip pitch is changed in the stretching apparatus of FIG. 1, FIG. 2 being an illustration of a state in which the clip pitch is minimum and FIG. 3 being an illustration of a state in which the clip pitch is maximum. When viewed in plan view, a stretching apparatus 100 has, on both of its left and right sides, an endless loop 10L and an endless loop 10R each having many clips 20 for holding a film so that the loops may be bilaterally symmetric with each other. It should be noted that in this description, an endless loop on a left side when viewed from a film inlet side is referred to as "left endless loop 10L" and an endless loop on a right side is referred to as "right endless loop 10R". Each of the clips 20 of the left and right endless loops 10L and 10R is guided by a reference rail 70 to cyclically move in a loop manner. The clips 20 of the left endless loop 10L cyclically move in a counterclockwise direction and the clips 20 of the right endless loop 10R cyclically move in a clockwise direction. In the stretching apparatus, a holding zone A, a preheating zone B, a first oblique stretching zone C, a second oblique stretching zone D, and a releasing zone E are arranged in the stated order from a sheet inlet side toward a sheet outlet side. It should be noted that those zones mean zones in which the film to be stretched is substantially held, preheated, subjected to first oblique stretching and second oblique stretching, and released, respectively, and do not mean mechanically or structurally independent sections. In addition, attention should be paid to the fact that a ratio among the lengths of the respective zones in the stretching apparatus of FIG. 1 is different from the actual length ratio.

In the holding zone A and the preheating zone B, the right and left endless loops 10R and 10L are configured to be substantially parallel to each other while being separated from each other by a distance corresponding to the initial width of the film to be stretched. In the first oblique stretching zone C and the second oblique stretching zone D, the right and left endless loops 10R and 10L are configured so that the distance by which the loops are separated from each other may gradually enlarge from the preheating zone B side toward the releasing zone E until the distance corresponds to the width of the film after its stretching. In the releasing zone E, the right and left endless loops 10R and 10L are configured to be substantially parallel to each other while being separated from each other by a distance corresponding to the width of the film after the stretching.

The clips (left clips) 20 of the left endless loop 10L and the clips (right clips) 20 of the right endless loop 10R can each independently cyclically move. For example, driving sprockets 11 and 12 of the left endless loop 10L are rotationally driven in the counterclockwise direction by electric motors 13 and 14, and the driving sprockets 11 and 12 of the right endless loop 10R are rotationally driven in the clockwise direction by the electric motors 13 and 14. As a result, a running force is imparted to a clip-carrying member 30 of each of drive rollers (not shown) engaging with the driving sprockets 11 and 12. Thus, the clips 20 of the left endless loop 10L cyclically move in the counterclockwise direction and the clips 20 of the right endless loop 10R cyclically move in the clockwise direction. The clips 20 of the left endless loop 10L and the clips 20 of the right endless loop 10R can each independently be cyclically moved by each independently driving a left electric motor and a right electric motor.

Further, the clips (left clips) 20 of the left endless loop 10L and the clips (right clips) 20 of the right endless loop 10R are each of a variable pitch type. That is, the clip pitches (clip-to-clip distances) of the left and right clips 20 and 20 in the longitudinal direction (MD) can each independently change in association with their movement. The variable pitch type can be realized by any appropriate construction. Now, description is given by taking a link mechanism (pantograph mechanism) as an example.

As illustrated in FIG. 2 and FIG. 3, the elongated rectangular clip-carrying members 30 are arranged in a lateral direction in a planar view by which the clips 20 are individually carried. Although not shown, the clip-carrying members 30 are each formed so as to be of a frame structure closed by an upper beam, a lower beam, a front wall (wall on the clip side), and a rear wall (wall on a side opposite to the clip), and having a strong section. The clip-carrying members 30 are each arranged so as to roll on running road surfaces 81 and 82 by virtue of running wheels 38 on both of its ends. It should be noted that in FIG. 2 and FIG. 3, a running wheel on the front wall side (running wheel rolling on the running road surface 81) is not shown. The running road surfaces 81 and 82 are parallel to the reference rail 70 over an entire region. On the rear sides (sides opposite to the clip) of the upper beam and lower beam of each of the clip-carrying members 30, a long hole 31 is formed along the lengthwise direction of the clip-carrying member and a slider 32 engages slidably in the lengthwise direction of the long hole 31. One first axis member 33 is vertically arranged near an end portion of each of the clip-carrying members 30 on the clip 20 side so as to penetrate its upper beam and lower beam. Meanwhile, one second axis member 34 is vertically arranged so as to penetrate the slider 32 of each of the clip-carrying members 30. One end of a main link member 35 is pivotally linked to the first axis member 33 of each of the clip-carrying members 30. The other end of the main link member 35 is pivotally linked to the second axis member 34 of the adjacent clip-carrying member 30. In addition to the main link member 35, one end of a sub-link member 36 is pivotally linked to the first axis member 33 of each of the clip-carrying members 30. The other end of the sub-link member 36 is pivotally linked to the central portion of the main link member 35 by a pivot 37. By virtue of the link mechanism based on the main link member 35 and the sub-link member 36, as the extent to which the slider 32 moves toward the rear side of the clip-carrying member 30 (side opposite to the clip) becomes larger as illustrated in FIG. 2, a pitch between the clip-carrying members 30 in the longitudinal direction (hereinafter simply referred to as "clip pitch") reduces, and as the extent to which the slider 32 moves toward the front side of the clip-carrying member 30 (clip side) becomes larger as illustrated in FIG. 3, the clip pitch increases. The positioning of the slider 32 is performed by a pitch-setting rail 90. As illustrated in FIG. 2 and FIG. 3, as the clip pitch becomes larger, the distance by which the reference rail 70 and the pitch-setting rail 90 are separated from each other reduces. It should be noted that additionally detailed description of the link mechanism is omitted because the mechanism is well-known in the art.

A retardation film having a slow axis in an oblique direction (e.g., a direction at 45° relative to the longitudinal direction) can be produced by obliquely stretching the film to be stretched with such stretching apparatus as described above. First, in the holding zone A (inlet of film intake by the stretching apparatus 100), both side edges of the film to be stretched are held with the clips 20 of the right and left endless loops 10R and 10L at constant clip pitches equal to each other, and the film is fed to the preheating zone B by the movement of the right and left endless loops 10R and 10L (substantially the movement of each of the clip-carrying members 30 guided by the reference rail 70).

B. Preheating Step

In the preheating zone (preheating step) B, as described above, the right and left endless loops 10R and 10L are configured to be substantially parallel to each other while being separated from each other by a distance corresponding to the initial width of the film to be stretched, and hence the film is basically heated without being laterally stretched or longitudinally stretched. However, a distance between the left and right clips (distance in a widthwise direction) may be slightly widened in order to avoid, for example, the following inconvenience: the film sags owing to the preheating to be brought into contact with a nozzle in an oven.

In the preheating step, the film is heated to a temperature T1 (° C.). The temperature T1 is preferably equal to or more than the glass transition temperature (Tg) of the film, more preferably equal to or more than Tg+2° C., still more preferably equal to or more than Tg+5° C. Meanwhile, the heating temperature T1 is preferably equal to or less than Tg+40° C., more preferably equal to or less than Tg+30° C. The temperature T1 is, for example, from 70° C. to 190° C., preferably from 80° C. to 180° C., though the temperature varies depending on the film to be used.

A time period required for the temperature of the film to be increased to the temperature T1 and a time period for which the temperature is held at the temperature T1 can be appropriately set depending on a constituent material for the film and a production condition (e.g., the speed at which the film is conveyed). The temperature increase time period and the holding time period can be controlled by adjusting, for example, the moving speeds of the clips 20, the length of the preheating zone, and the temperature of the preheating zone.

C. First Oblique Stretching Step

In the first oblique stretching zone (first oblique stretching step) C, the film is obliquely stretched by increasing the clip pitch of the clips on one side and reducing the clip pitch of the clips on the other side while extending the distance between the left and right clips (more specifically, the distance by which the right and left endless loops 10R and 10L are separated from each other). When the clip pitches are changed as described above, the left and right clips are moved at different speeds, whereby the oblique stretching can be performed while one side edge portion of the film is stretched in its lengthwise direction and the other side edge portion of the film is shrunk in the lengthwise direction. As a result, a slow axis can be expressed in a desired direction (e.g., a direction at 45° relative to the lengthwise direction) with high uniaxiality and a high in-plane alignment property.

One embodiment of the first oblique stretching is hereinafter specifically described with reference to FIG. 4 and FIG. 5. First, in the preheating zone B, both the left and right clip pitches are set to $P_1$. $P_1$ represents a clip pitch upon holding of the film. Next, simultaneously with the entry of the film into the first oblique stretching zone C, the increase of the clip pitch of the clips on one side (right side in the illustrated example) is started and the reduction of the clip pitch of the clips on the other side (left side in the illustrated example) is started. In the first oblique stretching zone C, the clip pitch of the right clips is increased to $P_2$ and the clip pitch of the left clips is reduced to $P_3$. Therefore, in the terminating portion of the first oblique stretching zone C (starting portion of the second oblique stretching zone D), the left clips move at the clip pitch $P_3$ and the right clips move at the clip pitch $P_2$. It should be noted that a ratio between the clip pitches can generally correspond to a ratio between the moving speeds of the clips. Accordingly, the ratio between the clip pitches of the left and right clips can generally correspond to a ratio between the stretching ratios of the right side edge portion and left side edge portion of the film in the MD direction.

Figure 4:
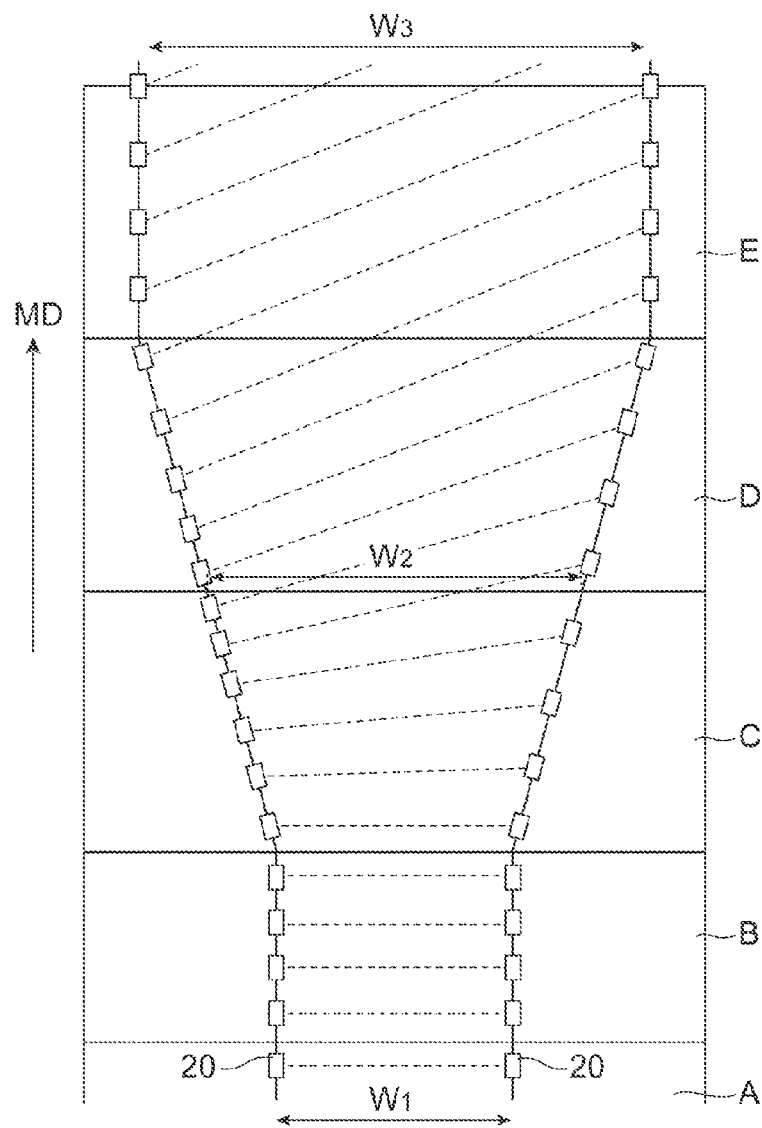
FIG. 4 is a schematic view for illustrating oblique stretching in a production method according to one embodiment of the present invention.
Figure 5:
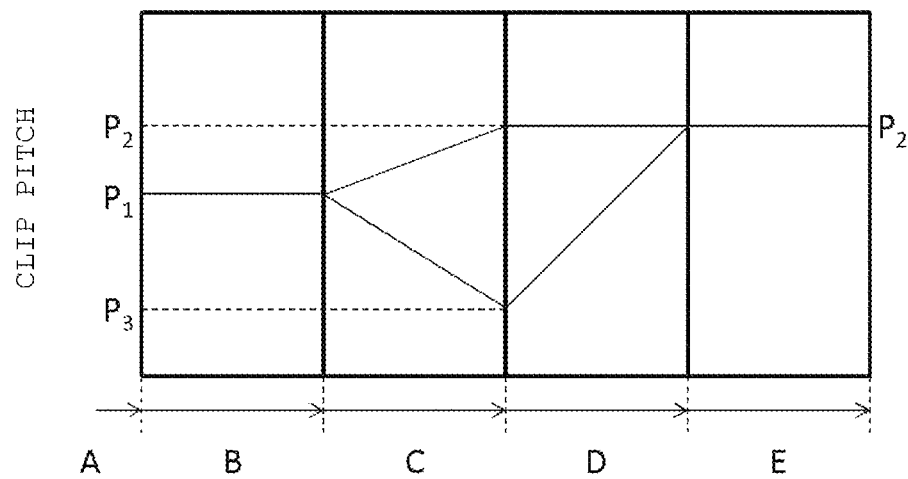
FIG. 5 is a graph for showing a relationship between each zone of the stretching apparatus and the clip pitch at the time of the oblique stretching illustrated in FIG. 4.
Figure 6:
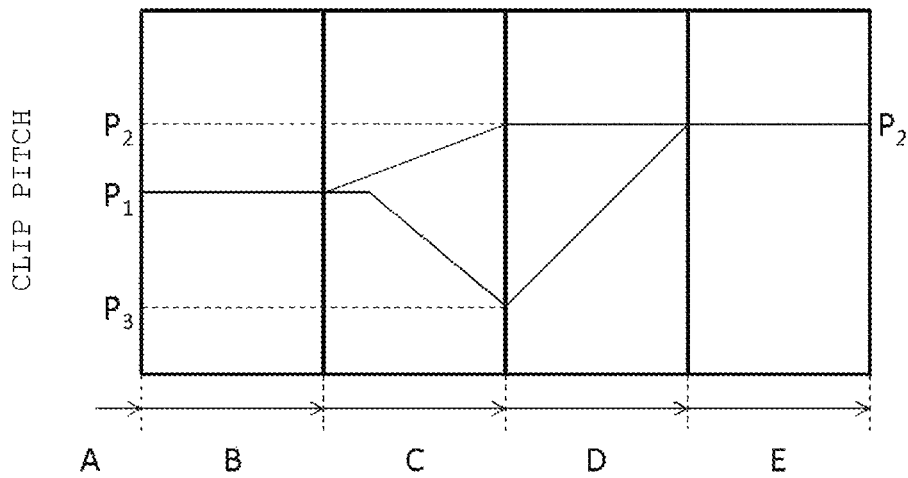
FIG. 6 is a graph for showing a relationship between each zone of the stretching apparatus and the clip pitch at the time of oblique stretching according to another embodiment.

In FIG. 4 and FIG. 5, both the position at which the clip pitch of the right clips starts to increase and the position at which the clip pitch of the left clips starts to reduce are each defined as the starting portion of the first oblique stretching zone C. However, unlike the illustrated example, the clip pitch of the left clips may start to reduce after the clip pitch of the right clips has started to increase (e.g., FIG. 6), or the clip pitch of the right clips may start to increase after the clip pitch of the left clips has started to reduce (not shown). In one preferred embodiment, after the clip pitch of the clips on one side has started to increase, the clip pitch of the clips on the other side starts to reduce. According to such embodiment, the film has already been stretched in the widthwise direction to a certain extent (preferably from about 1.2 times to 2.0 times), and hence a wrinkle hardly occurs even when the clip pitch on the other side is largely reduced. Accordingly, the oblique stretching can be performed at an additionally acute angle, and hence a retardation film having high uniaxiality and a high in-plane alignment property can be suitably obtained.

Similarly, in FIG. 4 and FIG. 5, the increase of the clip pitch of the right clips and the reduction of the clip pitch of the left clips continue up to the terminating portion of the first oblique stretching zone C (starting portion of the second oblique stretching zone D), but unlike the illustrated example, the following is permitted: one of the increase and reduction of the clip pitches ends before the terminating portion of the first oblique stretching zone C, and the clip pitch is maintained as it is up to the terminating portion of the first oblique stretching zone C.

The change ratio ($P_2/P_1$) of the clip pitch to be increased is preferably from 1.25 to 1.75, more preferably from 1.30 to 1.70, still more preferably from 1.35 to 1.65. In addition, the change ratio ($P_3/P_1$) of the clip pitch to be reduced is, for example, 0.50 or more and less than 1, preferably from 0.50 to 0.95, more preferably from 0.55 to 0.90, still more preferably from 0.55 to 0.85. When the change ratios of the clip pitches fall within such ranges, a slow axis can be expressed in a direction at about 45° relative to the lengthwise direction of the film with high uniaxiality and a high in-plane alignment property.

As described above, the clip pitches can be adjusted by positioning the sliders through the adjustment of the distance by which the pitch-setting rail and reference rail of the stretching apparatus are separated from each other.

The stretching ratio ($W_2/W_1$) of the film in the widthwise direction in the first oblique stretching step is preferably from 1.1 times to 3.0 times, more preferably from 1.2 times to 2.5 times, still more preferably from 1.25 times to 2.0 times. When the stretching ratio is less than 1.1 times, a corrugated galvanized iron-like wrinkle may occur in the side edge portion on the shrunk side. In addition, when the stretching ratio is more than 3.0 times, the biaxiality of the retardation film to be obtained is raised, and hence in the case where the film is applied to a circularly polarizing plate or the like, its viewing angle characteristic may reduce.

In one embodiment, the first oblique stretching is performed so that the product of the change ratio of the clip pitch of the clips on one side and the change ratio of the clip pitch of the clips on the other side may be preferably from 0.7 to 1.5, more preferably from 0.8 to 1.45, still more preferably from 0.85 to 1.40. When the product of the change ratios falls within such range, a retardation film having high uniaxiality and a high in-plane alignment property can be obtained.

The first oblique stretching can be typically performed at a temperature T2. The temperature T2 is preferably from Tg−20° C. to Tg+30° C. where Tg represents the glass transition temperature of the resin film, more preferably from Tg−10° C. to Tg+20° C., particularly preferably about Tg. The temperature T2 is, for example, from 70° C. to 180° C., preferably from 80° C. to 170° C., though the temperature varies depending on the resin film to be used. A difference (T1−T2) between the temperature T1 and the temperature T2 is preferably ±2° C. or more, more preferably ±5° C. or more. In one embodiment, the relationship between T1 and T2 satisfies T1>T2 and hence the film heated to the temperature T1 in the preheating step can be cooled to the temperature T2.

D. Second Oblique Stretching Step

In the second oblique stretching zone (second oblique stretching step) D, the film is obliquely stretched by maintaining or reducing the clip pitch of the clips on the one side and increasing the clip pitch of the clips on the other side so that the clip pitches of the left and right clips are equal to each other, while extending the distance between the left and right clips (more specifically, the distance by which the right and left endless loops 10R and 10L are separated from each other). When the oblique stretching is performed while the difference between the left and right clip pitches is reduced as described above, the film can be sufficiently stretched in an oblique direction while an excess stress is alleviated. In addition, the film can be subjected to the releasing step in a state where the moving speeds of the left and right clips are equal to each other, and hence a variation in, for example, speed at which the film is conveyed hardly occurs at the time of the release of the left and right clips, and subsequent take-up of the film can be suitably performed.

One embodiment of the second oblique stretching is hereinafter specifically described with reference to FIG. 4 and FIG. 5. First, the increase of the clip pitch of the left clips is started simultaneously with the entry of the film into the second oblique stretching zone D. In the second oblique stretching zone D, the clip pitch of the left clips is increased to $P_2$. Meanwhile, the clip pitch of the right clips is maintained at $P_2$ in the second oblique stretching zone D. Therefore, in the terminating portion of the second oblique stretching zone D (starting portion of the releasing zone E), both the left clips and the right clips move at the clip pitch $P_2$.

The change ratio ($P_2/P_3$) of the clip pitch to be increased in the embodiment is not limited as long as the effects of the present invention are not impaired. The change ratio ($P_2/P_3$) is, for example, from 1.3 to 4.0, preferably from 1.5 to 3.0.

Figure 7:
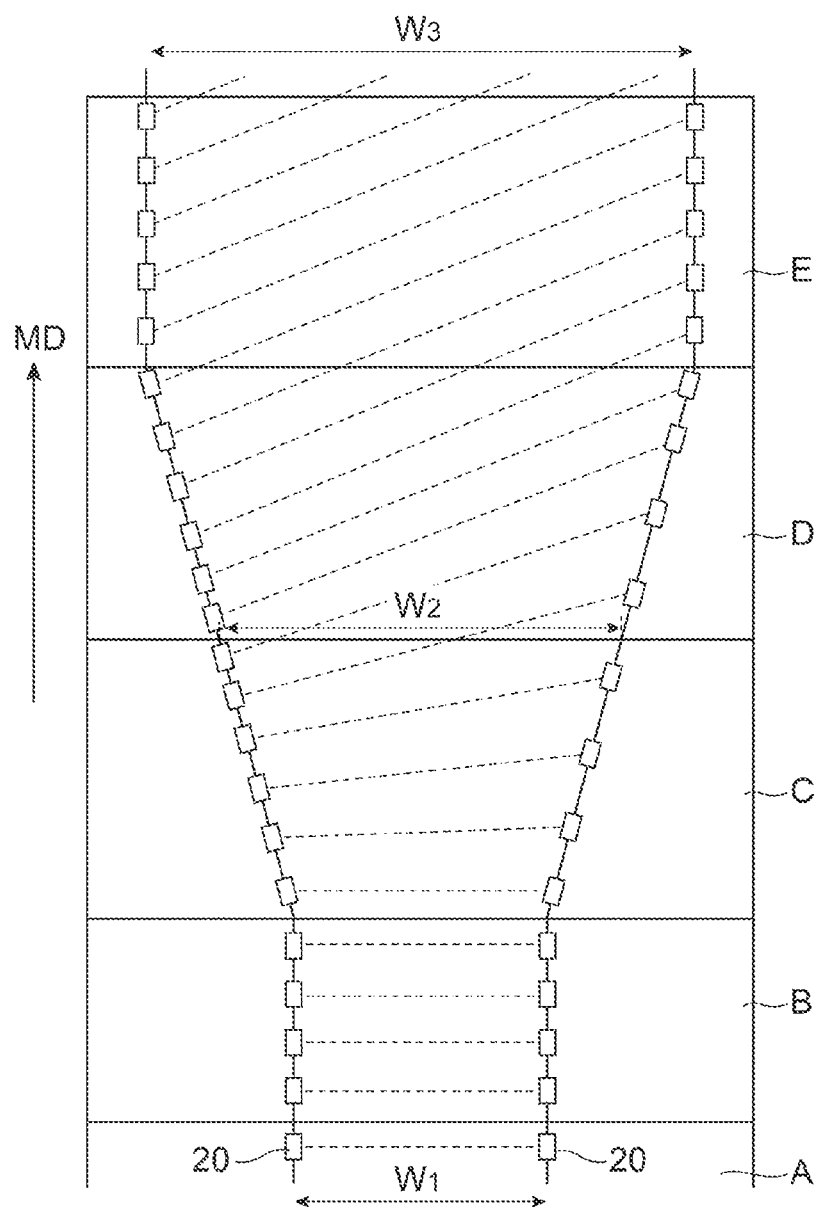
FIG. 7 is a schematic view for illustrating oblique stretching in a production method according to another embodiment of the present invention.
Figure 8:
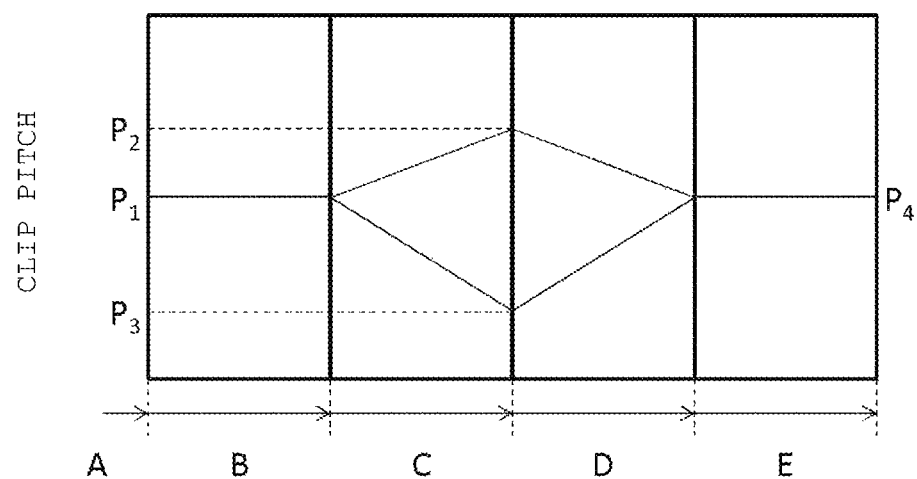
FIG. 8 is a graph for showing a relationship between each zone of the stretching apparatus and the clip pitch at the time of the oblique stretching illustrated in FIG. 7.

Next, another embodiment of the second oblique stretching is specifically described with reference to FIG. 7 and FIG. 8. First, simultaneously with the entry of the film into the second oblique stretching zone D, the reduction of the clip pitch of the right clips is started and the increase of the clip pitch of the left clips is started. In the second oblique stretching zone D, the clip pitch of the right clips is reduced to $P_4$ and the clip pitch of the left clips is increased to $P_4$. Therefore, in the terminating portion of the second oblique stretching zone D (starting portion of the releasing zone E), both the left clips and the right clips move at the clip pitch $P_4$. It should be noted that in the illustrated example, for simplicity, both the position at which the clip pitch of the right clips starts to reduce and the position at which the clip pitch of the left clips starts to increase are each defined as the starting portion of the second oblique stretching zone D, but these positions may be different positions. Similarly, the position at which the reduction of the clip pitch of the right clips ends and the position at which the increase of the clip pitch of the left clips ends may be different positions.

The change ratio ($P_4/P_2$) of the clip pitch to be reduced in the embodiment and the change ratio ($P_4/P_3$) of the clip pitch to be increased therein are not limited as long as the effects of the present invention are not impaired. The change ratio ($P_4/P_2$) is, for example, 0.4 or more and less than 1.0, preferably from 0.6 to 0.95. In addition, the change ratio ($P_4/P_3$) is, for example, more than 1.0 and 2.0 or less, preferably from 1.2 to 1.8. The $P_4$ is preferably equal to or more than the $P_1$. When $P_4<P_1$, a problem such as the occurrence of a wrinkle in a side end portion or an increase in biaxiality may occur.

The stretching ratio ($W_3/W_2$) of the film in the widthwise direction in the second oblique stretching step is preferably from 1.1 times to 3.0 times, more preferably from 1.2 times to 2.5 times, still more preferably from 1.25 times to 2.0 times. When the stretching ratio is less than 1.1 times, a corrugated galvanized iron-like wrinkle may occur in the side edge portion on the shrunk side. In addition, when the stretching ratio is more than 3.0 times, the biaxiality of the retardation film to be obtained is raised, and hence in the case where the film is applied to a circularly polarizing plate or the like, its viewing angle characteristic may reduce. In addition, a stretching ratio ($W_3/W_1$) in the widthwise direction in the first oblique stretching step and the second oblique stretching step is preferably from 1.2 times to 4.0 times, more preferably from 1.4 times to 3.0 times from the same viewpoints as those described above.

In one embodiment, the first oblique stretching and the second oblique stretching are performed so that an oblique stretching ratio determined from the following equation (1) may be preferably 2.0 or more, more preferably from 2.0 to 4.0, still more preferably from 2.5 to 3.5. When the oblique stretching ratio is less than 2.0, the biaxiality of the retardation film may be raised or its in-plane alignment property may reduce.

$$S=\sqrt{W_3^2=(v3'*(t3-t3'))^2}/W_1 \qquad \text{Equation (1)}$$

(In the equation:

$W_1$ represents the width of the film before the first oblique stretching;

$W_3$ represents the width of the film after the second oblique stretching;

v3' represents the moving speed of the clips having a clip pitch to be increased in the first oblique stretching step when the clip pitch of the clips changes to a predetermined clip pitch in the second oblique stretching step;

t3 represents a time period from the entry of the clips having a clip pitch to be reduced in the first oblique stretching step into the preheating zone to the end of the second oblique stretching step; and t3' represents a time period from the entry of the clips having a clip pitch to be increased in the first oblique stretching step into the preheating zone to the end of the second oblique stretching step.)

With regard to the v3', the predetermined clip pitch means a clip pitch after the maintenance or reduction of the clip pitch in the second oblique stretching step following the completion of the increase of the clip pitch in the first oblique stretching step, and corresponds to the $P_2$ or $P_4$ in the description of the section C. In addition, when the moving speed of the clips having a clip pitch to be increased in the first oblique stretching step at a time when the clip pitch of the clips is changed to the predetermined clip pitch (corresponding to the $P_2$ in the description of the section C) in the first oblique stretching step is represented by v2', in the case where v2'=v3', the t3 is represented by the following equation (2) and the t3' is represented by the following equation (3), and in the case where v2'>v3', the t3 is represented by the following equation (4) and the t3' is represented by the following equation (5).

Figure 9:
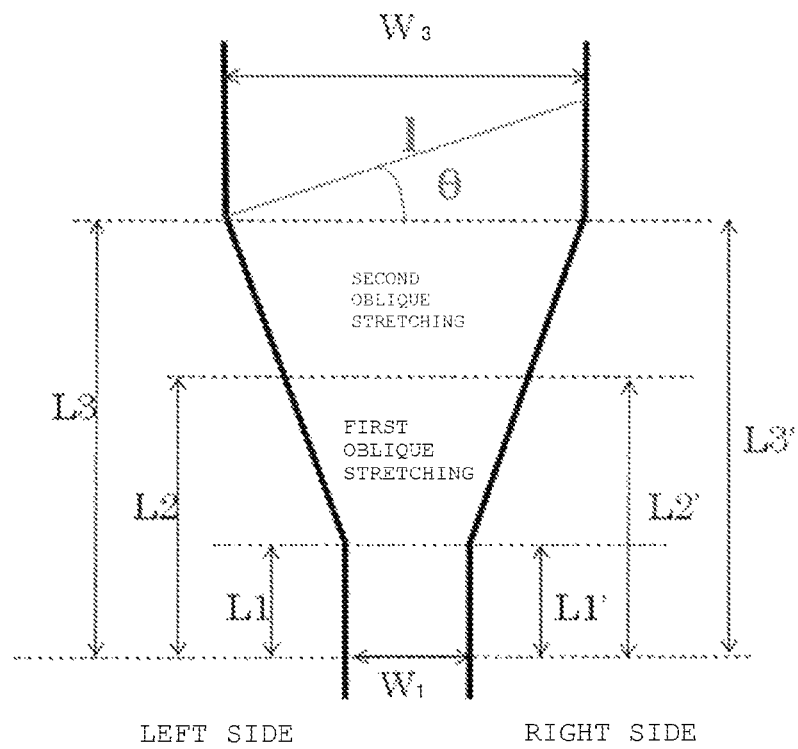
FIG. 9 is a schematic view for illustrating a relationship between the oblique stretching in the production method of the present invention and the equation (1).
Figure 10:
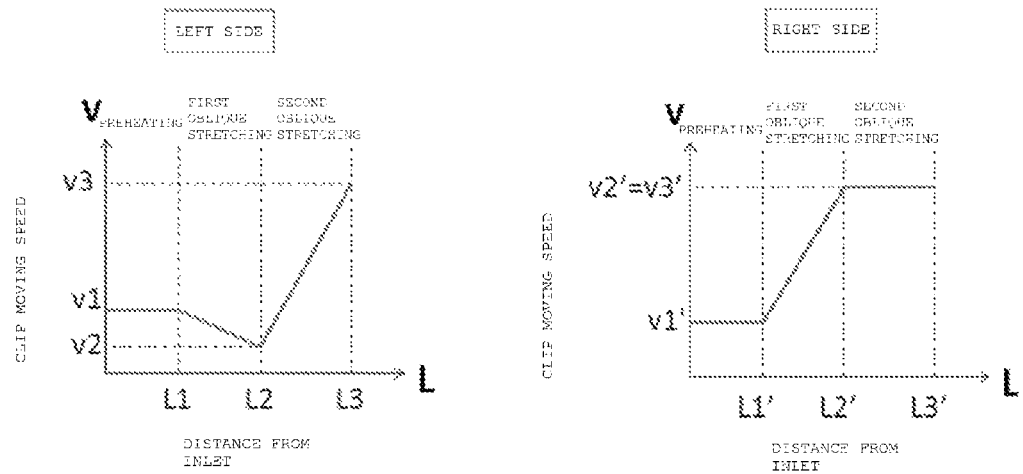
FIG. 10 are schematic views for illustrating the respective moving speeds of left and right clips in one embodiment of the oblique stretching in the production method of the present invention, and the equation (1).
Figure 11:
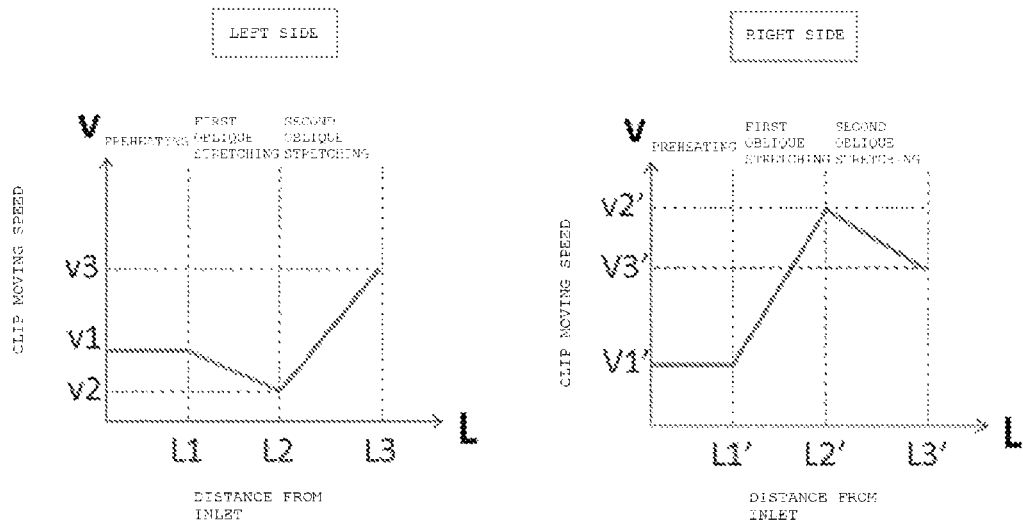
FIG. 11 are schematic views for illustrating the respective moving speeds of left and right clips in another embodiment of the oblique stretching in the production method of the present invention, and the equation (1).

The equations (2) to (4) are hereinafter described. In the description of the respective symbols in the equations, reference can be made to FIGS. 9 to 11. It should be noted that an asterisk mark (*) in each of the equations (1) to (5) is a multiplication sign. In addition, the unit of a film width is m, the unit of a velocity is m/sec, the unit of a distance is m, and the unit of a time period is sec.

$$t3=(1/a1*\ln(a1*L3+b1)-(1/a1)*\ln(a1*L2+b1)+(1/a)*\ln(a*L2+b)-(1/a)/\ln(a*L1+b)+L1/v1 \qquad \text{Equation (2)}$$

(In the equation:

a1=(v2−v3)/(L2−L3);

b1=v3−a1*L3;

a=(v1−v2)/(L1−L2);

b=v2−a*L2;

v1 represents the moving speed of the clips having a clip pitch to be reduced in the first oblique stretching step when the clips pass the preheating zone;

v2 represents the moving speed of the clips having a clip pitch to be reduced in the first oblique stretching step when the clip pitch of the clips is reduced to a predetermined clip pitch (corresponding to the $P_3$ in the description of the section C) in the first oblique stretching step;

v3 represents the moving speed of the clips having a clip pitch to be reduced in the first oblique stretching step when the clip pitch of the clips is increased to a predetermined clip pitch (corresponding to the $P_2$ or $P_4$ in the description of the section D) in the second oblique stretching step;

L1 represents a distance from the inlet of the preheating zone to the position at which the clips having a clip pitch to be reduced in the first oblique stretching step start to reduce the clip pitch (in one embodiment, a distance from the inlet of the preheating zone to the outlet of the preheating zone);

L2 represents a distance from the inlet of the preheating zone to the position at which the clips having a clip pitch to be reduced in the first oblique stretching step start to increase the clip pitch (in one embodiment, a distance from the inlet of the preheating zone to the outlet of the first oblique stretching zone); and L3 represents a distance from the inlet of the preheating zone to the position at which the clips having a clip pitch to be reduced in the first oblique stretching step end the increase of the clip pitch (in one embodiment, a distance from the inlet of the preheating zone to the outlet of the second oblique stretching zone).)

$$t3' = (L1'/v1') + (1/a') * \ln(a'L2'+b') - (1/a') * \ln(a'*L1'+b') + (L3'-L2')/v3' \qquad \text{Equation (3)}$$

(In the equation:

$a' = (v1'-v2')/(L1'-L2')$;

$b' = v3' - a'*L2'$;

v1' represents the moving speed of the clips having a clip pitch to be increased in the first oblique stretching step when the clips pass the preheating zone;

v2' represents the moving speed of the clips having a clip pitch to be increased in the first oblique stretching step when the clip pitch of the clips is increased to a predetermined clip pitch (corresponding to the $P_2$ in the description of the section C) in the first oblique stretching step;

v3' represents the moving speed of the clips having a clip pitch to be increased in the first oblique stretching step when the clips pass the second oblique stretching zone;

L1' represents a distance from the inlet of the preheating zone to the position at which the clips having a clip pitch to be increased in the first oblique stretching step start to increase the clip pitch (in one embodiment, a distance from the inlet of the preheating zone to the outlet of the preheating zone);

L2' represents a distance from the inlet of the preheating zone to the position at which the clips having a clip pitch to be increased in the first oblique stretching step end the increase of the clip pitch (in one embodiment, a distance from the inlet of the preheating zone to the outlet of the first oblique stretching zone); and L3' represents a distance from the inlet of the preheating zone to the outlet of the second oblique stretching zone.)

$$t3 = (1/a1)*\ln(a1*L3+b1) - (1/a1)*\ln(a1*L2+b1) + (1/a)*\ln(a*L2+b) - (1/a)*\ln(a*L1+b) + L1/v1 \qquad \text{Equation (4)}$$

(In the equation, a1, b1, a, b, v1, v2, v3, L1, L2, and L3 are as defined for the equation (2).)

$$t3' = (L1'/v1') + (1/a')*\ln(a'*L2'+b') - (1/a')*\ln(a'*L1'+b') + (1/a'')*\ln(a''*L3'+b'') - (1/a'')*\ln(a''*L2'+b'') \qquad \text{Equation (5)}$$

(In the equation:

$a' = (v1'-v2')/(L1'-L2')$;

$b' = v2' - a'*L2'$;

$a'' = (v2'-v3')/(L2'-L3')$;

$b'' = v3' - a''*L3'$;

v1' represents the moving speed of the clips having a clip pitch to be increased in the first oblique stretching step when the clips pass the preheating zone;

v2' represents the moving speed of the clips having a clip pitch to be increased in the first oblique stretching step when the clip pitch of the clips is increased to a predetermined clip pitch (corresponding to the $P_2$ in the description of the section C) in the first oblique stretching step;

v3' represents the moving speed of the clips having a clip pitch to be increased in the first oblique stretching step when the clip pitch of the clips is reduced to a predetermined clip pitch (corresponding to the $P_4$ in the description of the section D) in the second oblique stretching step;

L1' represents a distance from the inlet of the preheating zone to the position at which the clips having a clip pitch to be increased in the first oblique stretching step start to increase the clip pitch (in one embodiment, a distance from the inlet of the preheating zone to the outlet of the preheating zone);

L2' represents a distance from the inlet of the preheating zone to the position at which the clips having a clip pitch to be increased in the first oblique stretching step end the increase of the clip pitch (in one embodiment, a distance from the inlet of the preheating zone to the outlet of the first oblique stretching zone); and L3' represents a distance from the inlet of the preheating zone to the position at which the clips having a clip pitch to be increased in the first oblique stretching step end the reduction of the clip pitch to a predetermined clip pitch (corresponding to the $P_4$ in the description of the section D) in the second oblique stretching step (in one embodiment, a distance from the inlet of the preheating zone to the outlet of the second oblique stretching zone).)

The second oblique stretching can be typically performed at a temperature T3. The temperature T3 can be equal to the temperature T2.

E. Releasing Step

Finally, the clips holding the film are released, whereby the retardation film is obtained. The clips are released after the following has been performed as required: the stretched state of the film is fixed by subjecting the film to heat treatment, and the film is cooled.

The heat treatment can be typically performed at a temperature T4. The temperature T4 varies depending on the film to be stretched. In some cases, T3≥T4, and in other cases, T3<T4. In general, when the film is formed of an amorphous material, T3≥T4, and when the film is formed of a crystalline material, a crystallization treatment may be performed by setting the T3 so that the T3 may be lower than the T4. When T3≥T4, a difference (T3−T4) between the temperatures T3 and T4 is preferably from 0° C. to 50° C. A heat treatment time is typically from 10 seconds to 10 minutes.

The thermally fixed film is cooled to Tg or less in ordinary cases. After that, the clips have been released, and then, portions held by the clips on both ends of the film are cut, and the remainder is taken up.

F. Film to be Stretched and Retardation Film Obtained by Stretching

The film to be suitably used in the production method of the present invention (substantially the stretching method described in the section A to the section E) is, for example, any appropriate film that can be used as a retardation film. As a constituent material for the film, there are given, for example, a polycarbonate resin, a polyvinyl acetal resin, a cycloolefin-based resin, an acrylic resin, a cellulose ester-based resin, a cellulose-based resin, a polyester-based resin, a polyester carbonate-based resin, an olefin-based resin, and a polyurethane-based resin. Of those, a polycarbonate resin, a polyvinyl acetal resin, a cellulose ester-based resin, a polyester-based resin, or a polyester carbonate-based resin is preferred because a retardation film showing so-called reverse wavelength dispersion dependency can be obtained with any one of these resins. Those resins may be used alone or in combination depending on desired characteristics.

Any appropriate polycarbonate-based resin is used as the polycarbonate-based resin. A preferred example thereof is a polycarbonate resin containing a structural unit derived from a dihydroxy compound. Specific examples of the dihydroxy compound include 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl) fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl) fluorene. The polycarbonate resin may contain a structural unit derived from the dihydroxy compound as well as a structural unit derived from a dihydroxy compound such as isosorbide, isomannide, isoidide, spiroglycol, dioxaneglycol, diethylene glycol (DEG), triethylene glycol (TEG), polyethylene glycol (PEG), or a bisphenol.

The polycarbonate resin as described above is disclosed in, for example, JP 2012-67300 A and JP 3325560 B2 in detail. The disclosures of the patent literatures are incorporated herein by reference.

The glass transition temperature of the polycarbonate resin is preferably 110° C. or more and 250° C. or less, more preferably 120° C. or more and 230° C. or less. When the glass transition temperature is excessively low, the heat resistance of the resin tends to deteriorate and hence the resin may cause a dimensional change after its forming into a film. When the glass transition temperature is excessively high, the forming stability of the resin at the time of its forming into a film may deteriorate. In addition, the transparency of the film may be impaired. It should be noted that the glass transition temperature is determined in conformity with JIS K 7121 (1987).

Any appropriate polyvinyl acetal resin may be used as the polyvinyl acetal resin. The polyvinyl acetal resin can be typically obtained by subjecting at least two kinds of aldehyde compounds and/or ketone compounds, and a polyvinyl alcohol-based resin to a condensation reaction. Specific examples of the polyvinyl acetal resin and a detailed production method therefor are disclosed in, for example, JP 2007-161994 A. The disclosure is incorporated herein by reference.

The refractive index characteristics of the retardation film obtained by stretching the film to be stretched preferably show a relationship of nx>ny. In addition, the in-plane alignment property of the retardation film is preferably high, and for example, its birefringent index Δn (Δn=nx−ny) measured at a wavelength of 550 nm is preferably from 0.002 to 0.005, more preferably from 0.0025 to 0.004. Further, the retardation film can preferably function as a λ/4 plate. An in-plane retardation Re(550) of the retardation film is preferably from 100 nm to 180 nm, more preferably from 135 nm to 155 nm. It should be noted that in this description, nx represents a refractive index in a direction in which an in-plane refractive index becomes maximum (i.e., a slow axis direction), ny represents a refractive index in a direction perpendicular to the slow axis in a plane (i.e., a fast axis direction), and nz represents a thickness direction refractive index. In addition, Re(λ) represents the in-plane retardation of the film measured with light having a wavelength of λ nm at 23° C. Therefore, the Re(550) represents the in-plane retardation of the film measured with light having a wavelength of 550 nm at 23° C. The Re(λ) is determined from the equation "Re(λ)=(nx−ny)×d" where d represents the thickness (nm) of the film.

The retardation film shows any appropriate refractive index ellipsoid as long as the ellipsoid has a relationship of nx>ny. The refractive index ellipsoid of the retardation film preferably shows a relationship of nx>ny≥nz. The Nz coefficient of the retardation film is preferably from 1 to 1.3, more preferably from 1 to 1.25, still more preferably from 1 to 1.2. The Nz coefficient is determined from Nz=Rth(λ)/Re(λ), where Rth(λ) represents the thickness direction retardation of the film measured with light having a wavelength of λ nm at 23° C. Rth(λ) is determined from the equation "Rth(λ)=(nx−nz)×d".

The retardation film preferably shows so-called reverse wavelength dispersion dependency. Specifically, the in-plane retardation thereof satisfies a relationship of Re(450)<Re(550)<Re(650). Re(450)/Re(550) is preferably 0.8 or more and less than 1.0, more preferably from 0.8 to 0.95. Re(550)/Re(650) is preferably 0.8 or more and less than 1.0, more preferably from 0.8 to 0.97.

The retardation film has an absolute value of its photoelastic coefficient of preferably from $2\times10^{-12}$ (m$^2$/N) to $100\times10^{-12}$ (m$^2$/N), more preferably from $2\times10^{-12}$ (m$^2$/N) to $50\times10^{-12}$ (m$^2$/N).

Figure 12:
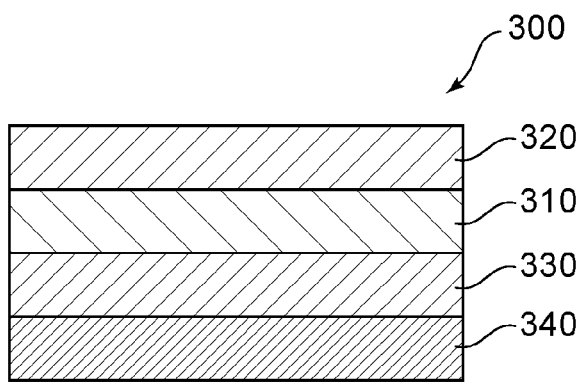
FIG. 12 is a schematic sectional view of a circularly polarizing plate using a retardation film obtained by the production method of the present invention.

G. Circularly Polarizing Plate and Production Method for Circularly Polarizing Plate Typically, the retardation film obtained by the production method of the present invention can be suitably used in a circularly polarizing plate. FIG. 12 is a schematic sectional view of an example of such circularly polarizing plate. A circularly polarizing plate 300 of the illustrated example includes a polarizer 310, a first protective film 320 arranged on one side of the polarizer 310, a second protective film 330 arranged on the other side of the polarizer 310, and a retardation film 340 arranged outside the second protective film 330. The retardation film 340 is the retardation film obtained by the production method of the present invention. The second protective film 330 may be omitted. In that case, the retardation film 340 can function as a protective film for the polarizer. An angle formed between the absorption axis of the polarizer 310 and the slow axis of the retardation film 340 is preferably from 30° to 60°, more preferably from 38° to 52°, still more preferably from 43° to 47°, particularly preferably about 45°. It should be noted that detailed description of the constructions of the polarizer and the protective film is omitted because the constructions are well-known in the art.

The circularly polarizing plate may further include any appropriate optical member or optical functional layer at any appropriate position depending on purposes. For example, the outer surface of the first protective film 320 may be subjected to a surface treatment such as a hard coat treatment, an antireflection treatment, an antisticking treatment, an antiglare treatment, or a light diffusion treatment. In addition, another retardation film showing any appropriate refractive index ellipsoid may be arranged on at least one side of the retardation film 340 depending on purposes. Further, an optical member such as a front substrate (e.g., a transparent protective substrate or a touch panel) may be arranged outside the first protective film 320.

The retardation film obtained by the production method of the present invention is extremely suitable for the production of a circularly polarizing plate. Details about the foregoing are as described below. The retardation film has an elongated shape and has a slow axis in an oblique direction (as described above, a direction at, for example, 45° relative to its lengthwise direction). In many cases, a polarizer having an elongated shape has an absorption axis in its lengthwise direction or widthwise direction, and hence the use of the retardation film obtained by the production method of the present invention enables the utilization of the so-called roll-to-roll process and enables the production of a circularly polarizing plate with extremely excellent production efficiency. Moreover, the retardation film obtained by the production method of the present invention has high uniaxiality and a high in-plane alignment property, and hence can provide a circularly polarizing plate having extremely excellent optical characteristics. It should be noted that the roll-to-roll process refers to a method involving continuously bonding films each having an elongated shape with their lengthwise directions aligned with each other while conveying the films with a roll.

Figure 13:
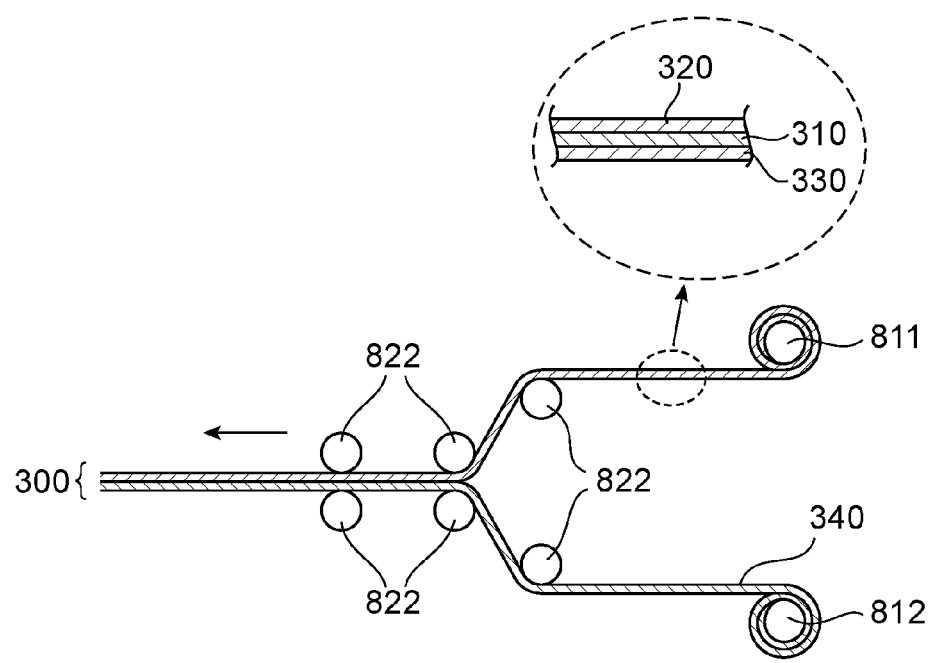
FIG. 13 is a schematic view for illustrating a production method for a circularly polarizing plate according to one embodiment of the present invention.

A production method for a circularly polarizing plate according to one embodiment of the present invention is simply described with reference to FIG. 13. In FIG. 13, reference symbols 811 and 812 represent rolls for taking up a polarizing plate and a retardation film, respectively, and reference symbol 822 represents a conveying roll. In the illustrated example, the polarizing plate (first protective film 320/polarizer 310/second protective film 330) and the retardation film 340 are fed in a direction indicated by the arrow, and are bonded under a state in which their respective lengthwise directions are aligned with each other. At that time, the bonding is performed so that the second protective film 330 of the polarizing plate and the retardation film 340 are adjacent to each other. Thus, such circularly polarizing plate 300 as illustrated in FIG. 12 can be obtained. Although not shown, a circularly polarizing plate in which the retardation film 340 functions as a protective film can also be produced by, for example, bonding the polarizing plate (first protective film 320/polarizer 310) and the retardation film 340 so that the polarizer 310 and the retardation film 340 are adjacent to each other.

EXAMPLES

Now, the present invention is specifically described byway of Examples. However, the present invention is not limited by Examples below. It should be noted that measurement and evaluation methods in Examples are as described below.

(1) Alignment Angle (Direction in which Slow Axis is Expressed)

A sample was produced by cutting the central portion of a retardation film obtained in each of Examples and Comparative Example into a square shape measuring 50 mm wide by 50 mm long so that one side of the square was parallel to the widthwise direction of the film. An alignment angle θ of the sample at a wavelength of 550 nm and 23° C. was measured with a Mueller matrix polarimeter (manufactured by Axometrics, product name: "Axoscan"). It should be noted that the alignment angle θ was measured under a state in which the sample was placed so as to be parallel to a measuring stage.

(2) In-plane Retardation Re

Measurement was performed at a wavelength of 550 nm and 23° C. with a product available under the product name "Axoscan" from Axometrics in the same manner as in the section (1).

(3) Thickness Direction Retardation Rth

Measurement was performed at a wavelength of 550 nm and 23° C. with a product available under the product name "Axoscan" from Axometrics in the same manner as in the section (1).

(4) Nz Coefficient

An Nz coefficient was calculated from the equation "Nz=Rth/Re".

(5) Viewing Angle Characteristic

An organic EL panel was removed from an organic EL display (manufactured by LG, product name: "15EL9500") and a polarizing plate was peeled from the organic EL panel. A circularly polarizing plate was produced by bonding the retardation film obtained in each of Examples and Comparative Example, and the polarizing plate with a pressure-sensitive adhesive so that an angle formed between the alignment angle of the film and the absorption axis of the plate became 45°. The circularly polarizing plate was bonded to the organic EL panel from which the polarizing plate had been peeled with a pressure-sensitive adhesive. The organic EL panel having bonded thereto the circularly polarizing plate was visually observed from various directions, and its reflectance and reflection hue were observed. Evaluation criteria are as described below.

○ . . . Even when the display is viewed from the various directions, the reflection hue and the reflectance are generally constant.

Δ . . . As the angle at which the display is viewed deepens, the reflection hue and the reflectance are found to change.

× . . . The reflection hue and the reflectance are found to change depending on the angle at which the display is viewed.

(6) Wrinkle

The state of the retardation film obtained in each of Examples and Comparative Example was visually observed. Evaluation criteria are as described below.

○ . . . Neither a wrinkle nor waviness is observed over the entirety of the film.

Δ . . . A corrugated galvanized iron-like wrinkle is present in an end portion in the widthwise direction of the film and hence the portion waves, but the central portion of the film has no waviness.

× . . . A corrugated galvanized iron-like wrinkle is present in the film and hence the film waves.

(7) Thickness

Measurement was performed with a microgauge-type thickness meter (manufactured by Mitutoyo Corporation).

(8) Birefringence (Δn)

Birefringence was determined by dividing the Re value obtained with the product available under the product name "Axoscan" from Axometrics by the thickness obtained with the microgauge-type thickness meter (manufactured by Mitutoyo Corporation).

Example 1

(Production of Polycarbonate Resin Film)

Polymerization was performed with a batch polymerization apparatus formed of two vertical reactors each including a stirring blade and a reflux condenser controlled to 100° C. 9,9-[4-(2-Hydroxyethoxy)phenyl]fluorene (BHEPF), isosorbide (ISB), diethylene glycol (DEG), diphenyl carbonate (DPC), and magnesium acetate tetrahydrate were loaded at a molar ratio "BHEPF/ISB/DEG/DPC/magnesium acetate" of 0.348/0.490/0.162/1.005/1.00×10$^{-5}$. After a first reactor had been sufficiently purged with nitrogen (oxygen concentration: 0.0005 vol % to 0.001 vol %), the inside of the reactor was warmed with a heating medium, and when a temperature in the reactor reached 100° C., stirring was started. 40 Minutes after the start of the temperature increase, the internal temperature was caused to reach 220° C. and the reactor was controlled so as to hold the temperature, and at the same time, a pressure reduction was started. 90 Minutes after the temperature had reached 220° C., a pressure in the reactor was set to 13.3 kPa. A phenol vapor produced as a by-product of the polymerization reaction was introduced into the reflux condenser at 100° C., a monomer component present in a slight amount in the phenol vapor was returned to the reactor, and a phenol vapor that did not condense was introduced into a condenser at 45° C. and recovered.

Nitrogen was introduced into the first reactor to return the pressure to the atmospheric pressure once. After that, an oligomerized reaction liquid in the first reactor was transferred to a second reactor. Next, the increase of a temperature in the second reactor and the reduction of a pressure therein were started, and the internal temperature and the pressure were set to 240° C. and 0.2 kPa, respectively in 50 minutes. After that, the polymerization was caused to proceed until predetermined stirring power was achieved. When the predetermined power was achieved, nitrogen was introduced into the reactor to return the pressure to the atmospheric pressure, and the reaction liquid was taken out in the form of a strand and pelletized with a rotary cutter. Thus, a polycarbonate resin A having a copolymerization composition "BHEPF/ISB/DEG" of 34.8/49.0/16.2 [mol %] was obtained. The polycarbonate resin had a reduced viscosity of 0.430 dL/g and a glass transition temperature of 128° C.

The resultant polycarbonate resin was dried in a vacuum at 80° C. for 5 hours, and was then formed into a polycarbonate resin film having a thickness of 150 µm with a film-producing apparatus including a uniaxial extruder (manufactured by Isuzu Kakoki, screw diameter: 25 mm, cylinder preset temperature: 220° C.), a T-die (width: 900 mm, preset temperature: 220° C.), a chill roll (preset temperature: 120° C. to 130° C.), and a take-up unit.

(Preheating and First and Second Oblique Stretching Steps)

The polycarbonate resin film obtained as described above was subjected to a preheating treatment, first oblique stretching, and second oblique stretching with such apparatus as illustrated in FIG. 1 to FIG. 3 according to such clip pitch profile as illustrated in FIG. 5 to provide a retardation film. A specific procedure is as described below. The polycarbonate resin film (thickness: 150 µm, width ($W_1$): 765 mm) was preheated to 145° C. in the preheating zone of the stretching apparatus. In the preheating zone, the clip pitches ($P_1$) of the left and right clips were 125 mm. Next, the increase of the clip pitch of the right clips and the reduction of the clip pitch of the left clips were started simultaneously with the entry of the film into the first oblique stretching zone C. In the terminating portion of the first oblique stretching zone C, the change ratio ($P_2/P_1$) of the clip pitch of the right clips was 1.42, and the change ratio ($P_3/P_1$) of the clip pitch of the left clips was 0.72. It should be noted that the first oblique stretching was performed at 138° C. The width ($W_2$) of the film after the first oblique stretching was 1,092 mm (TD stretching ratio ($W_2/W_1$)=1.45 times). Next, simultaneously with the entry of the film into the second oblique stretching zone D, the increase of the clip pitch of the left clips was started, and the clip pitch was increased from $P_3$ to $P_2$. In the second oblique stretching zone D, the change ratio ($P_2/P_3$) of the clip pitch of the left clips was 1.97. Meanwhile, the clip pitch of the right clips was maintained at $P_2$ in the second oblique stretching zone D. It should be noted that the second oblique stretching was performed at 138° C. The width ($W_3$) of the film after the second oblique stretching was 1,419 mm. In addition, the stretching ratio ($W_3/W_1$) in the widthwise direction in the first oblique stretching step and the second oblique stretching step was 1.9 times.

(Releasing Step)

Next, in the releasing zone, the film was thermally fixed by being held at 125° C. for 60 seconds. The thermally fixed film was cooled to 100° C., and then the left and right clips were released.

Thus, the retardation film (thickness: 55 µm, width: 1,419 mm) was obtained. The resultant retardation film was subjected to the evaluations (1) to (8). The results are shown in Table 1.

Example 2

A retardation film was obtained in the same manner as in Example 1 except that: a polycarbonate resin film (thickness: 140 µm, width: 765 mm) obtained in the same manner as in Example 1 was used; the clip pitches ($P_1$) of the left and right clips at the time of the start of the first oblique stretching step (in the preheating zone) were set to 150 mm; and the change ratio ($P_3/P_1$) of the clip pitch of the left clips was set to 0.6. The resultant retardation film was subjected to the same evaluations as those of Example 1. The results are shown in Table 1.

Example 3

A retardation film was obtained in the same manner as in Example 1 except that in the first oblique stretching step, the change ratio ($P_2/P_1$) of the clip pitch of the right clips was set to 1.6. The resultant retardation film was subjected to the same evaluations as those of Example 1. The results are shown in Table 1.

Example 4

A retardation film was obtained in the same manner as in Example 1 except that: a polycarbonate resin film (thickness: 175 µm, width: 765 mm) obtained in the same manner as in Example 1 was used; and in the first oblique stretching step, the change ratio ($P_2/P_1$) of the clip pitch of the right clips was set to 1.6, and the change ratio ($P_3/P_1$) of the clip pitch of the left clips was set to 0.9. The resultant retardation film was subjected to the same evaluations as those of Example 1. The results are shown in Table 1.

Example 5

A retardation film was obtained in the same manner as in Example 1 except that: a polycarbonate resin film (thickness: 155 µm, width: 765 mm) obtained in the same manner as in Example 1 was used; and the stretching ratio ($W_3/W_1$) in the widthwise direction in the first oblique stretching step and the second oblique stretching step was set to 1.7 times.

The resultant retardation film was subjected to the same evaluations as those of Example 1. The results are shown in Table 1.

Example 6

A retardation film was obtained in the same manner as in Example 1 except that: a cycloolefin-based resin film ("ZEONOR ZF-14 Film" manufactured by Zeon Corporation, thickness: 100 μm, width: 765 mm) was used instead of the polycarbonate-based resin film; the film was preheated to 150° C. in the preheating zone; and the first oblique stretching and the second oblique stretching were performed at 150° C. The resultant retardation film was subjected to the same evaluations as those of Example 1. The results are shown in Table 1.

Example 7

(Production of Polyvinyl Acetal-based Resin Film)

880 Grams of a polyvinyl alcohol-based resin [manufactured by The Nippon Synthetic Chemical Industry Co., Ltd., trade name: "NH-18" (polymerization degree=1,800, saponification degree=99.0%)] was dried at 105° C. for 2 hours, and was then dissolved in 16.72 kg of dimethyl sulfoxide (DMSO). 298 Grams of 2-methoxy-1-naphthaldehyde and 80 g of p-toluenesulfonic acid monohydrate were added to the solution, and the mixture was stirred at 40° C. for 1 hour. 318 Grams of benzaldehyde was added to the reaction solution and the mixture was stirred at 40° C. for 1 hour. After that, 457 g of dimethyl acetal was further added to the resultant and the mixture was stirred at 40° C. for 3 hours. After that, 213 g of triethylamine was added to the resultant to terminate a reaction. The resultant crude product was reprecipitated with methanol. A filtered polymer was dissolved in tetrahydrofuran, followed by reprecipitation with methanol again. The precipitate was filtered and dried to provide 1.19 kg of a white polymer.

$^1$H-NMR measurement showed that the resultant polymer had a repeating unit represented by the following formula (XI) and a ratio (molar ratio) "l:m:n:o" was 10:25:52:11. In addition, the glass transition temperature of the polymer was measured to be 130° C.

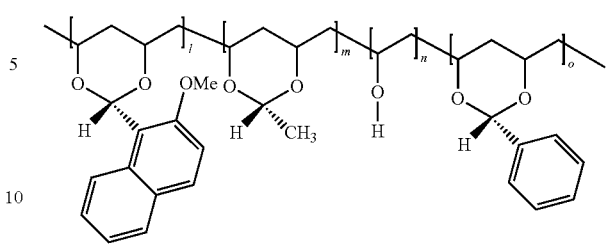

(XI)

The resultant polymer was dissolved in methyl ethyl ketone (MEK). The resultant solution was applied onto a polyethylene terephthalate film (thickness: 70 μm) with a die coater and dried with an air-circulating drying oven. After that, the dried product was peeled from the polyethylene terephthalate film to provide a film having a thickness of 190 μm and a width of 765 mm.

A retardation film was obtained in the same manner as in Example 1 except that: the polyvinyl acetal-based resin film was used; the film was preheated to 145° C. in the preheating zone; and the first oblique stretching and the second oblique stretching were performed at 137° C. The resultant retardation film was subjected to the same evaluations as those of Example 1. The results are shown in Table 1.

Example 8

A retardation film was obtained in the same manner as in Example 2 except that in the first oblique stretching step, the reduction of the clip pitch of the left clips was started at a position behind the position at which the increase of the clip pitch of the right clips was started (at the position at which the clip pitch of the right clips increased by a factor of 1.21 as compared to the $P_1$ and the stretching ratio in the widthwise direction became 1.225 times). The resultant retardation film was subjected to the same evaluations as those of Example 1. The results are shown in Table 1.

Comparative Example 1

A retardation film was obtained in the same manner as in Example 1 except that in the first oblique stretching step, the clip pitch of the left clips was not changed, and the change ratio ($P_2/P_1$) of the clip pitch of the right clips was set to 1.6. The resultant retardation film was subjected to the same evaluations as those of Example 1. The results are shown in Table 1.

TABLE 1

| | First oblique stretching step | | | First and second oblique stretching steps | | | | | | | Alignment | | |
|---|---|---|---|---|---|---|---|---|---|---|---|---|---|
| | Left clip pitch change ratio ($P_3/P_1$) | Right clip pitch change ratio ($P_2/P_1$) | Product of change ratios | TD stretching ratio ($W_3/W_1$) | Oblique stretching ratio | Film material | Nz coefficient | Δn | Viewing angle change | Thickness (μm) | angle (degree(s)) | Δnd (nm) | Wrinkle |
| Example 1 | 0.72 | 1.42 | 1.02 | 1.9 | 2.94 | Polycarbonate | 1.23 | 0.0023 | ○ | 55 | 48 | 140 | ○ |
| Example 2 | 0.6 | 1.42 | 0.85 | 1.9 | 3.49 | Polycarbonate | 1.15 | 0.0025 | ○ | 58 | 52 | 142 | Δ |
| Example 3 | 0.72 | 1.6 | 1.15 | 1.9 | 3.39 | Polycarbonate | 1.15 | 0.0028 | ○ | 50 | 55 | 141 | ○ |
| Example 4 | 0.9 | 1.6 | 1.44 | 1.9 | 2.73 | Polycarbonate | 1.25 | 0.0023 | ○ | 60 | 50 | 140 | ○ |
| Example 5 | 0.72 | 1.42 | 1.02 | 1.7 | 2.81 | Polycarbonate | 1.28 | 0.0021 | Δ | 70 | 52 | 144 | Δ |
| Example 6 | 0.72 | 1.42 | 1.02 | 1.9 | 2.94 | Cycloolefin | 1.23 | 0.0034 | ○ | 37 | 48 | 142 | ○ |
| Example 7 | 0.72 | 1.42 | 1.02 | 1.9 | 2.94 | Polyvinyl acetal | 1.23 | 0.002 | ○ | 70 | 48 | 143 | Δ |
| Example 8 | 0.6 | 1.42 | 0.85 | 1.9 | 3.32 | Polycarbonate | 1.1 | 0.0021 | ○ | 68 | 49 | 141 | ○ |

TABLE 1-continued

| | First oblique stretching step | | | | | | | | | | | |
|---|---|---|---|---|---|---|---|---|---|---|---|---|
| | Left clip | Right clip | | First and second oblique stretching steps | | | | | | Align- | | |
| | pitch change ratio ($P_3/P_1$) | pitch change ratio ($P_2/P_1$) | Product of change ratios | TD stretching ratio ($W_3/W_1$) | Oblique stretching ratio | Film material | Nz coefficient | Δn | Viewing angle change | Thickness (μm) | ment angle (degree(s)) | Δnd (nm) | Wrinkle |
| Comparative Example 1 | 1 | 1.6 | 1.60 | 1.9 | 2.46 | Polycarbonate | 1.33 | 0.0019 | x | 75 | 47 | 144 | ○ |

<Evaluation>

As shown in the table, the retardation film having an elongated shape obtained by the production method of the present invention has a slow axis in a direction at about 45° relative to its lengthwise direction and has an in-plane retardation of about 140 nm. Accordingly, a circularly polarizing plate can be formed with high production efficiency by laminating the film and a polarizer having an elongated shape and having an absorption axis in its lengthwise direction or widthwise direction according to the roll-to-roll process. In addition, it is found that the retardation film obtained by the production method of the present invention has an Nz coefficient of 1.3 or less and hence has high uniaxiality. Further, the film has high birefringence (Δn) and is hence excellent in in-plane alignment property.

INDUSTRIAL APPLICABILITY

The retardation film obtained by the production method of the present invention is suitably used in a circularly polarizing plate, and as a result, is suitably used in an image display apparatus such as a liquid crystal display apparatus (LCD) or an organic electroluminescence display apparatus (OLED).

REFERENCE SIGNS LIST 10L endless loop
10R endless loop
20 clip
30 clip-carrying member
70 reference rail
90 pitch-setting rail
100 stretching apparatus
300 circularly polarizing plate
310 polarizer
320 first protective film
330 second protective film
340 retardation film

The invention claimed is:

1. A production method for a retardation film, comprising:
holding left and right end portions of a film with left and right variable pitch-type clips configured to have clip pitches changing in a longitudinal direction, respectively (holding step);
preheating the film (preheating step);
increasing the clip pitch of the clips on one side and simultaneously reducing the clip pitch of the clips on another side, while extending a distance between the left and right clips, to obliquely stretch the film (first oblique stretching step);
maintaining or reducing the clip pitch of the clips on the one side and increasing the clip pitch of the clips on the another side so that the clip pitches of the left and right clips are equal to each other, while extending the distance between the left and right clips, to obliquely stretch the film (second oblique stretching step); and
releasing the film from being held with the clips (releasing step).

2. The production method for a retardation film according to claim 1, wherein in the first oblique stretching step and the second oblique stretching step, an oblique stretching ratio determined from the following equation (1) is 2.0 or more, and in the first oblique stretching step, a change ratio of the clip pitch of the clips on the another side is 0.5 or more and less than 1:

$$S=\sqrt{W_3^2+(v3'*(t3-t3'))^2}/W_1 \qquad \text{Equation (1)}$$

where:
$W_1$ represents a width of the film before the first oblique stretching (unit: m);
$W_3$ represents a width of the film after the second oblique stretching (unit: m);
v3' represents a moving speed of the clips having a clip pitch to be increased in the first oblique stretching step when the clip pitch of the clips changes to a predetermined clip pitch in the second oblique stretching step (unit: m/sec);
t3 represents a time period from entry of the clips having a clip pitch to be reduced in the first oblique stretching step into a preheating zone to an end of the second oblique stretching step (unit: sec); and
t3' represents a time period from entry of the clips having a clip pitch to be increased in the first oblique stretching step into the preheating zone to the end of the second oblique stretching step (unit: sec).

3. The production method for a retardation film according to claim 1, wherein in the first oblique stretching step, a product of a change ratio of the clip pitch of the clips on the one side and a change ratio of the clip pitch of the clips on the another side is from 0.7 to 1.5.

4. The production method for a retardation film according to claim 1, wherein a formation material for the film contains a polycarbonate resin, a polyvinyl acetal resin, a cycloolefin-based resin, a cellulose-based resin, a cellulose ester-based resin, a polyester-based resin, or a polyester carbonate-based resin.

5. A production method for a retardation film, comprising:
holding left and right end portions of a film with left and right variable pitch-type clips configured to have clip pitches changing in a longitudinal direction, respectively (holding step);

preheating the film (preheating step);

increasing the clip pitch of the clips on one side and reducing the clip pitch of the clips on another side, while extending a distance between the left and right clips, to obliquely stretch the film, provided that the reducing the clip pitch of the clips on another side is started after the increasing the clip pitch of the clips on one side is started (first oblique stretching step);

reducing the clip pitch of the clips on the one side and simultaneously increasing the clip pitch of the clips on the another side so that the clip pitches of the left and right clips are equal to each other, while extending the distance between the left and right clips, to obliquely stretch the film (second oblique stretching step); and releasing the film from being held with the clips (releasing step).

6. The production method for a retardation film according to claim 5, wherein in the first oblique stretching step and the second oblique stretching step, an oblique stretching ratio determined from the following equation (1) is 2.0 or more, and in the first oblique stretching step, a change ratio of the clip pitch of the clips on the another side is 0.5 or more and less than 1:

$$S=\sqrt{W_3^2+(v3'*(t3-t3'))^2}/W_1 \quad \text{Equation (1)}$$

where:
W$_1$ represents a width of the film before the first oblique stretching (unit: m);
W$_3$ represents a width of the film after the second oblique stretching (unit: m);
v3' represents a moving speed of the clips having a clip pitch to be increased in the first oblique stretching step when the clip pitch of the clips changes to a predetermined clip pitch in the second oblique stretching step (unit: m/sec);
t3 represents a time period from entry of the clips having a clip pitch to be reduced in the first oblique stretching step into a preheating zone to an end of the second oblique stretching step (unit: sec); and
t3' represents a time period from entry of the clips having a clip pitch to be increased in the first oblique stretching step into the preheating zone to the end of the second oblique stretching step (unit: sec).

7. The production method for a retardation film according to claim 5, wherein in the first oblique stretching step, a product of a change ratio of the clip pitch of the clips on the one side and a change ratio of the clip pitch of the clips on the another side is from 0.7 to 1.5.

8. The production method for a retardation film according to claim 5, wherein a formation material for the film contains a polycarbonate resin, a polyvinyl acetal resin, a cycloolefin-based resin, a cellulose-based resin, a cellulose ester-based resin, a polyester-based resin, or a polyester carbonate-based resin.

9. A production method for a circularly polarizing plate, comprising:
obtaining a retardation film having an elongated shape by the production method according to claim 1, and
continuously bonding the obtained retardation film having an elongated shape and a polarizing plate having an elongated shape with lengthwise directions of the film and the plate aligned with each other while conveying the film and the plate.

10. A production method for a circularly polarizing plate, comprising:
obtaining a retardation film having an elongated shape by the production method according to claim 5, and
continuously bonding the obtained retardation film having an elongated shape and a polarizing plate having an elongated shape with lengthwise directions of the film and the plate aligned with each other while conveying the film and the plate.

\* \* \* \* \*